United States Patent
Kim et al.

(10) Patent No.: US 9,185,651 B2
(45) Date of Patent: Nov. 10, 2015

(54) METHOD FOR PERFORMING RANDOM ACCESS PROCEDURE FOR REPORTING ABNORMAL POWER OUTAGE IN WIRELESS ACCESS SYSTEM SUPPORTING M2M ENVIRONMENT

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 14/127,439

(22) PCT Filed: Jun. 19, 2012

(86) PCT No.: PCT/KR2012/004832
§ 371 (c)(1),
(2), (4) Date: Dec. 18, 2013

(87) PCT Pub. No.: WO2012/177029
PCT Pub. Date: Dec. 27, 2012

(65) Prior Publication Data
US 2014/0119201 A1    May 1, 2014

Related U.S. Application Data (60) Provisional application No. 61/498,604, filed on Jun. 19, 2011.

(51) Int. Cl.
| | |
|---|---|
| *H04W 52/02* | (2009.01) |
| *H04W 74/08* | (2009.01) |
| *H04W 4/00* | (2009.01) |
| *H04W 28/18* | (2009.01) |
| *H04W 92/18* | (2009.01) |

(52) U.S. Cl.
CPC .......... *H04W 52/0225* (2013.01); *H04W 4/005* (2013.01); *H04W 52/0216* (2013.01); *H04W 52/0235* (2013.01); *H04W 52/0238* (2013.01); *H04W 74/0833* (2013.01); *H04W 28/18* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2009/0129404 A1* | 5/2009 | Wu et al. | 370/468 |
| 2012/0226930 A1* | 9/2012 | Colban et al. | 713/340 |

FOREIGN PATENT DOCUMENTS

| | | |
|---|---|---|
| KR | 2008-0016316 | 2/2008 |

OTHER PUBLICATIONS

LG Electronics, "[DEV] Access distribution for M2M devices," IEEE S802.16p-rg-11_0026, Feb. 2011, 7 pages.
LG Electronics, "Randomisation in Access Stratum," SA WG2 Temporary Document, 3GPP TSG SA WG2 Meeting #79, TD S2-102634, May 2010, 3 pages.
PCT International Application No. PCT/KR2012/004832, Written Opinion of the International Searching Authority dated Dec. 27, 2012, 15 pages.

* cited by examiner

*Primary Examiner* — Thai Nguyen
(74) *Attorney, Agent, or Firm* — Lee, Hong, Degerman, Kang & Waimey (57) ABSTRACT

The present invention provides a variety of methods for an M2M terminal reporting a power outage when an abnormal power outage occurs, and apparatuses for supporting same. A method for performing a random access procedure for reporting the abnormal power outage in the wireless access system supporting an M2M environment, according to one embodiment of the present invention, comprises the steps of: an M2M device receiving a message comprising an abnormal power outage ranging backoff starting parameter and an abnormal power outage ranging backoff ending parameter, which are used for reporting the abnormal power outage; entering an idle mode; and performing the random access procedure for reporting the abnormal power outage using the abnormal power outage ranging backoff starting parameter and/or the abnormal power outage ranging backoff ending parameter, when the abnormal power outage occurs in the idle mode.

6 Claims, 6 Drawing Sheets

METHOD FOR PERFORMING RANDOM ACCESS PROCEDURE FOR REPORTING ABNORMAL POWER OUTAGE IN WIRELESS ACCESS SYSTEM SUPPORTING M2M ENVIRONMENT

CROSS-REFERENCE TO RELATED APPLICATIONS

This application is the National Stage filing under 35 U.S.C. 371 of International Application No. PCT/KR2012/004832, filed on Jun. 19, 2012, which claims the benefit of U.S. Provisional Application Ser. No. 61/498,604, filed on Jun. 19, 2011, the contents of which are all hereby incorporated by reference herein in their entirety.

TECHNICAL FIELD

The present invention relates to a wireless communication system and, more particularly, to a method for performing a random access procedure in order for an M2M device to report an associated event upon occurrence of an abnormal power outage and an apparatus for supporting the same.

BACKGROUND ART

Hereinafter, a machine-to-machine communication environment in the present invention will be described in brief.

Machine-to-machine (M2M) communication refers to communication between electronic devices as the name implies. In a broad sense, M2M communication means wired or wireless communication between electronic devices or communication between a device controlled by humans and a machine. Recently, M2M communication generally refers to wireless communication between electronic devices without human intervention.

In the early 1990s when the concept of M2M communication was first introduced, M2M communication was recognized as remote control or telematics and the market therefor was very limited. However, M2M communication has rapidly advanced in the past few years and the market therefor has vastly expanded, attracting worldwide attention. In particular, M2M communication has exerted a significant influence on the fields of fleet management in a point-of-sale (POS) system and security-related application markets, remote monitoring of machines and facilities, and smart metering of measuring operating time of construction equipment and automatically measuring heat or electricity use. Future M2M communication will be extended to various applications in association with existing mobile communication, ultra-fast wireless Internet, or low-output communication solutions such as Wi-Fi and ZigBee. That is, M2M communication will evolve from a business-to-business (B2B) application to a business-to-consumer (B2C) model.

In an era of M2M communication, all machines equipped with a subscriber identity module (SIM) card are able to transmit and receive data so that they can be remotely managed and controlled. For example, M2M communication technology may be used in a wide range of devices and equipment such as automobiles, trucks, trains, shipping containers, vending machines, gas tankers, etc.

Conventionally, terminals were managed individually for one-to-one communication between a base station (BS) and a terminal Assuming that numerous M2M devices communicate with the BS through one-to-one communication, network overload is likely to occur due to signaling generated between each of the M2M devices and the BS. As M2M communication rapidly spreads and expands, overhead may be problematic due to communication between the M2M devices or between the M2M devices and a BS.

Further, since a human does not participate in operations of M2M devices in an M2M system, an abnormal/involuntary power outage event may occur in the M2M devices. Such power outage may also occur in most M2M devices in a region to which the M2M devices of a power outage state belong.

If an involuntary power outage event occurs, M2M devices should report the power outage event to the BS. For example, M2M devices in an idle-mode state will perform a ranging procedure in order to report the power outage event and then collision may occur between M2M devices. Moreover, M2M devices in a normal-normal state will perform a bandwidth request procedure to report the power outage event and then there is a high possibility of collision between M2M devices.

If collision occurs between M2M devices, the M2M devices perform a collision resolution procedure. In this case, if the M2M devices perform random access by applying an initial backoff window size defined for network re-entry to existing terminals in normal mode and normal terminals, a probability of collision between the M2M devices and normal terminals increases and power outage reporting may be delayed.

In addition, such a random access procedure may consume unnecessary power in M2M devices and deteriorate efficiency of system resource use. Furthermore, if an additional ranging channel for M2M devices is not used in a system, the random access procedure may affect even a random access procedure for existing terminals.

DETAILED DESCRIPTION OF THE INVENTION

Technical Problems

The present invention is devised to solve the afore-mentioned problems and an object of the present invention lies in providing an efficient communication method for M2M devices.

Another object of the present invention lies in providing a power outage reporting method for minimizing a probability of generating collision between M2M devices in an involuntary/abnormal power outage event.

Still another object of the present invention lies in providing a method for rapidly reporting a power outage event upon occurrence of the power outage event.

A further object of the present invention lies in providing a method for reducing congestion generated when M2M devices simultaneously perform random access using existing contention parameters (e.g. initial backoff window) upon occurrence of an abnormal power outage event.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve the objects, the present invention provides various methods for reporting a power outage event by M2M devices upon occurrence of an abnormal power outage event and devices for supporting the same.

According to an aspect of the present invention, provided herein is a method for performing a random access procedure to report an involuntary power outage event in a wireless access system supporting a machine-to-machine (M2M) environment, including receiving a message including an involuntary power outage ranging backoff start parameter and an involuntary power outage ranging backoff end parameter, used by an M2M device to report the involuntary power outage event, entering idle mode, and, upon occurrence of the involuntary power outage event in the idle mode, performing the random access procedure for reporting the involuntary power outage event using one or more of the involuntary power outage ranging backoff start parameter and the involuntary power outage ranging backoff end parameter.

In another aspect of the present invention, provided herein is an M2M device for performing a random access procedure to report an involuntary power outage event in a wireless access system supporting an M2M environment, including a transmitter, a receiver, and a processor supporting the random access procedure.

In this case, the M2M device may receive, using the receiver, a message including an involuntary power outage ranging backoff start parameter and an involuntary power outage ranging backoff end parameter, used to report the involuntary power outage event, enter idle mode by controlling the processor, and, upon occurrence of the involuntary power outage event in the idle mode, perform the random access procedure for reporting the involuntary power outage event using one or more of the involuntary power outage ranging backoff start parameter and the involuntary power outage ranging backoff end parameter.

In the above aspects of the present invention, the message may be one of a superframe subpacket-3 message, a system configuration descriptor message, and an uplink channel descriptor message.

The message may further include a scaling factor and the scaling factor may be multiplied by one or more of the involuntary power outage ranging backoff start parameter and the involuntary power outage ranging backoff end parameter to indicate an execution time point of the random access procedure performed by M2M devices. That is, the random access procedure may be performed based on a value obtained by multiplying the scaling factor by the involuntary power outage ranging backoff start/end parameter.

The message may further include an initial ranging backoff start parameter and an initial ranging backoff end parameter, for initial ranging contention and, the M2M device may perform the random access procedure using one or more of the initial ranging backoff start parameter and the initial ranging backoff end parameter if the involuntary power outage situation is not occurred.

The above-described aspects of the present invention are merely some parts of the embodiments of the present invention and various embodiments into which the technical features of the present invention are incorporated can be derived and understood by persons skilled in the art from the following detailed description of the present invention.

Advantageous Effects

According to the embodiments of the present invention, the following effects are obtained.

First, an efficient communication method for M2M devices is provided.

Second, upon occurrence of a power down event or an abnormal power outage event, M2M devices can immediately report such an event to a BS.

Third, the probability of collision between M2M devices and collision between an M2M device and a normal terminal during power outage reporting in an involuntary/abnormal power outage event can be minimized.

Fourth, a congestion situation generated when M2M devices simultaneously perform random access using existing contention parameters.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings. Namely, those skilled in the art will also understand unintended effects that can be achieved from implementation of the present invention from the embodiments of the present invention.

DESCRIPTION OF DRAWINGS

The accompanying drawings, which are included to provide a further understanding of the invention, illustrate embodiments of the invention and together with the description serve to explain the principle of the invention. However, technical features of the present invention are not limited to a specific drawing and features shown in each drawing may configure a new embodiment by combination.

BEST MODE FOR CARRYING OUT THE INVENTION

The embodiments of the present invention relate to various methods for reporting a power outage event by M2M devices upon occurrence of an abnormal power outage event in a wireless access system supporting an M2M environment and to devices for supporting the same.

The embodiments described hereinbelow are combinations of elements and features of the present invention in prescribed forms. The elements or features may be considered selective unless otherwise mentioned. Each element or feature may be practiced without being combined with other elements or features. In addition, some elements and/or features may be combined with one another to constitute the embodiments of the present invention. Operation orders described in embodiments of the present invention may be rearranged. Some elements or features of one embodiment may be included in another embodiment or may be replaced with corresponding elements or features of another embodiment.

In the description of the drawings, procedures or steps, which may obscure the substance of the present invention, will be avoided. In addition, procedures or steps that could be understood by those skilled in the art will not be described.

In the embodiments of the present invention, a description is given of data transmission and reception between a base station (BS) and a mobile station (BS). Here, the BS refers to a terminal node of a network communicating directly with the MS. In some cases, a specific operation described as being performed by the BS may be performed by an upper node of the BS.

Namely, in a network comprised of a plurality of network nodes including a BS, various operations performed for communication with an MS may be performed by the BS, or network nodes other than the BS. The term 'BS' may be replaced with the term fixed station, Node B, eNode B (eNB), advanced base station (ABS), access point, etc.

In addition, the term 'MS' may be replaced with the term user equipment (UE), subscriber station (SS), mobile subscriber station (MSS), mobile terminal, advanced mobile station (AMS), terminal, etc. Particularly, in the present invention, MS may have the same meaning as M2M device.

A transmitting end refers to a fixed and/or mobile node which transmits a data service or a voice service and a receiving end refers to a fixed and/or mobile node which receives a data service or a voice service. Therefore, in uplink, an MS may serve as a transmitting end and a BS may serve as a receiving end. Similarly, in downlink, the MS may serve as a receiving end and the BS may serve as a transmitting end.

The embodiments of the present invention may be supported by standard documents disclosed in at least one of wireless access systems including an institute of electrical and electronics engineers (IEEE) 802.xx system, a 3rd general partnership project (3GPP) system, a 3GPP long term evolution (LTE) system, and a 3GPP2 system. That is, obvious steps or portions which are not described in the embodiments of the present invention may be supported by the above documents.

For all terminology used herein, reference may be made to the above standard documents. Especially, the embodiments of the present invention may be supported by at least one of P802.16e-2004, P802.16e-2005, P803.16m, P802.16p, and P802.16.1b which are standard documents of the IEEE 802.16 system.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention. In the drawings, parts that are not related to a description of the present invention are omitted to clearly explain the present invention and the same reference numbers will be used throughout this specification to refer to the same or like parts.

Throughout the disclosure, if it is said that any part "includes" a constituent element, this means that the part may further include other constituent elements rather than excluding other constituent elements unless specified otherwise. In addition, the terms "... part", "... portion", and "... module" disclosed herein are used to indicate a unit for processing at least one function or operation, which may be realized by hardware, software, or a combination thereof.

In addition, the specific terms used in the embodiments of the present invention are provided to aid in understanding of the present invention and those terms may be changed without departing from the spirit of the present invention.

1. M2M Device General

Hereinafter, M2M communication refers to communication between terminals via a BS, communication between a BS and terminals without human intervention, or communication between M2M devices. Accordingly, an M2M device refers to a terminal that can support such M2M communication.

An access service network (ASN) for an M2M service is defined as an M2M ASN and a network entity communicating with M2M devices is called an M2M server. The M2M server executes an M2M application and provides an M2M specific service for one or more M2M devices. An M2M feature indicates the feature of an M2M application and one or more features may be necessary to provide the application. An M2M device group refers to a group of M2M devices which share one or more features in common.

Devices performing communication according to an M2M scheme (which may be called M2M devices, M2M communication devices, machine type communication (MTC) devices, etc.) will gradually increase in number in a given network as the number of machine application types thereof increases.

The machine application types include (1) security, (2) public safety, (3) tracking and tracing, (4) payment, (5) healthcare, (6) remote maintenance and control, (7) metering, (8) consumer device, (9) fleet management in a POS system and a security related application market, (10) M2M communication between vending machines, (11) remote monitoring of machines or facilities, and smart metering of measuring an operating time of construction equipment and automatically measuring heat or electricity use, and (12) surveillance video communication of a surveillance camera. However, the machine application types are not limited these types and a variety of machine application types are applicable.

Another feature of M2M devices is that they have low mobility or they seldom move once installed. In other words, this implies that the M2M devices are stationary for a considerably long time. An M2M communication system may simplify or optimize mobility-related operations for a specific stationary M2M application such as secured access and surveillance, public safety, payment, remote maintenance and control, and metering.

Thus, as the number of the machine application types increases, the number of M2M communication devices may rapidly increase compared to the number of a general mobile communication devices. Accordingly, if each of the M2M devices individually communicates with a BS, a wireless interface and/or a network may be subject to severe load.

Hereinafter, the embodiments of the present invention will be described when M2M communication is applied to a wireless communication system (e.g. P802.16e, P802.16m, P802.16.1b, P902.16p, etc.). However, the present invention is not limited thereto and is applicable to other communication systems such as a 3GPP LTE/LTE-A system.

Figure 1:
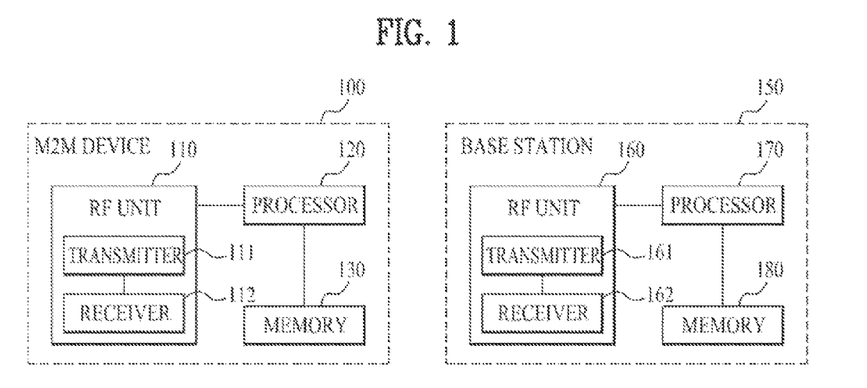
FIG. 1 is a diagram schematically explaining the configuration of an M2M device and a BS according to an embodiment of the present invention.

FIG. 1 is a diagram schematically explaining the configuration of an M2M device and a BS according to an embodiment of the present invention.

Referring to FIG. 1, an M2M device 100 may include a radio frequency (RF) unit 110 and a processor 120. ABS 150 may include an RF unit 160 and a processor 170. The M2M device 100 and the BS 150 may selectively include memories 130 and 180, respectively. Although one M2M device and one BS are shown in FIG. 1, an M2M communication environment may be established between a plurality of M2M devices and a BS.

The RF units 110 and 160 may include transmitters 111 and 161, respectively, and receivers 112 and 162, respectively. The transmitter 111 and the receiver 112 of the M2M device 100 are configured to transmit and receive signals to and from the BS 150 and other M2M devices. The processor 120, which is functionally connected to the transmitter 111 and the receiver 112, may be configured to control the transmitter 111 and the receiver 112 to exchange signals with other devices. The processor 120 may process signals to be transmitted and then transmit the processed signals to the transmitter 111, and may process signals received by the receiver 112.

If necessary, the processor 120 may store information included in exchanged messages in the memory 130. With such a configuration, the M2M device 100 may perform methods according to various embodiments of the present invention which will be described later.

Meanwhile, although not shown in FIG. 1, the M2M device 100 may further include a variety of components according to a machine application type thereof. For example, if the M2M device 100 is designed for smart metering, the M2M device 100 may include an additional component for power measurement and an operation for such power measurement may be controlled by the processor 120 shown in FIG. 1 or a separately configured processor (not shown).

While FIG. 1 illustrates an example of communication between the M2M device 100 and the BS 150, an M2M communication method according to the present invention may be performed between one or more M2M devices and each device may carry out methods according to various embodiments, which will be described later, with the same configuration as the configuration of each component illustrated in FIG. 1.

The transmitter 161 and the receiver 162 of the BS 150 are configured to transmit and receive signals to and from another BS, an M2M server, and M2M devices. The processor 170 may be functionally connected to the transmitter 161 and the receiver 162 to control the transmitter 161 and the receiver 162 to transmit and receive signals to and from other devices. The processor 170 may process signals to be transmitted and transmit the processed signals to the transmitter 161, and may process signals received by the receiver 162. If necessary, the processor 170 may store information included in exchanged messages in the memory 180. With such a configuration, the BS 150 may perform methods according to the above-described various embodiments of the present invention.

The processors 120 and 170 of the M2M device 110 and the BS 150 direct (e.g. control, adjust, manage, etc.) operations of the M2M 110 and the BS 150, respectively. The processors 120 and 170 may be respectively connected to the memories 130 and 180 which store program code and data. The memories 130 and 180 are connected respectively to the processors 120 and 170 and store operating systems, applications, and general files.

The processors 120 and 170 of the present invention may be called controllers, microcontrollers, microcomputers, etc. Meanwhile, the processors 120 and 170 may be implemented by hardware, firmware, software, or combinations thereof. When the embodiments of the present invention are implemented using hardware, the processors 120 and 170 may included application specific integrated circuits (ASICs), digital signal processors (DSPs), digital signal processing devices (DSPDs), programmable logic devices (PLDs), field programmable gate arrays (FPGAs), or the like, which are configured to implement the present invention.

Meanwhile, when the embodiments of the present invention are implemented using firmware or software, the firmware or software may be configured to include a module, a procedure, or a function which performs the function or operation of the present invention. The firmware or software configured to be able to perform the present invention may be included in the processors 120 and 170 or may be stored in the memories 130 and 180 so as to be executed by the processors 120 and 170.

Figure 2:
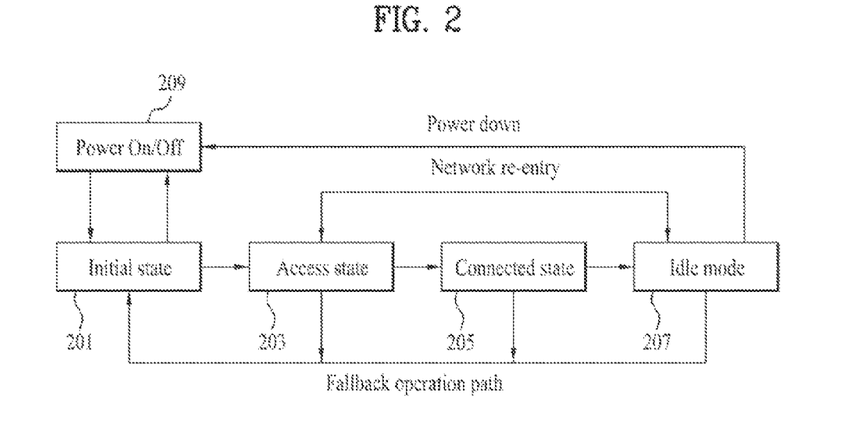
FIG. 2 is a diagram illustrating an exemplary state transition process of an M2M device used in the present invention.

FIG. 2 is a diagram illustrating an exemplary state transition process of an M2M device used in the present invention.

If an M2M device is powered on, the M2M device enters an initial state (201). Next, the M2M device enters a connected state (205) by performing an initial network entry process in an access state (203). The M2M device in the connected state transmits and receives data to and from a BS and, if no data for transmission and reception is present, the M2M device enters idle mode (207). The M2M device transitions to a power-off state (209) through a power down procedure in the idle mode. That is, if the M2M device is powered down in the idle mode, the M2M device enters the power-off state by performing a location update process for power down.

Further, even when the M2M device transmits and receives data in the connection state, upon occurrence of a power-down event (e.g. a power outage event), the M2M device enters the idle mode to perform location update, thereby entering the power-off state.

2. Idle Mode

Hereinafter, idle mode in an M2M environment in which the embodiments of the present invention are implemented will be described.

Idle mode refers to mode for operating a paging group, a paging cycle, and a paging offset, for power saving when an M2M device (i.e. an MS) has not received traffic from a BS for a predetermined time period.

For example, an MS transitioning to idle mode may receive a broadcast message (e.g. a paging message) broadcast by the BS only during a paging available interval of a paging cycle to determine whether to enter normal mode or to remain in an idle state.

The idle mode serves as a mechanism capable of periodically receiving a downlink message without registering in a specific BS (i.e. without performing handover, etc.), even if the MS roams a wireless link environment in which a plurality of BSs is present throughout a wide region.

For convenience of description, the idle mode will be described based on an IEEE 802.16e, 16m, or 16p system. However, the technical principle of the present invention is not limited thereto. To transition to the idle mode, the MS transmits a deregistration request (DREG-REQ) message to the BS to request deregistration with the BS. Next, the BS transmits a deregistration response (DREG-RSP) message to the MS as a response to the DREG-REQ message. In this case, the DREG-RSP message includes paging information. Transition to the idle mode of the MS may be initiated by the request of the BS (in an unsolicited manner). At this time, the BS transmits the DREG-RSP message to the MS.

The paging information may include a paging cycle, a paging offset, a paging group identifier (PGID), and a paging listening interval value.

Upon receipt of the DREG-RSP message from the BS, the MS transitions to the idle mode with reference to the paging information. The idle mode has a paging cycle and one paging cycle is composed of a paging listening interval and an unavailable interval. The paging listening interval may be interpreted as the same meaning as an available interval or a paging interval.

The paging offset represents a timing (as an example, a frame or a subframe) at which the paging listening interval is started in the paging cycle. The PGID indicates an ID of a paging group allocated to the MS. The paging information may include paging message offset information. The paging offset information indicates a timing at which a paging message is transmitted from the BS.

Next, the MS may receive the paging message transmitted thereto in the paging listening interval using the paging information. The paging message may be transmitted through the BS or a paging controller. That is, the MS monitors a radio channel according to the paging cycle in order to receive the paging message.

3. Power Down Procedure

Figure 3:
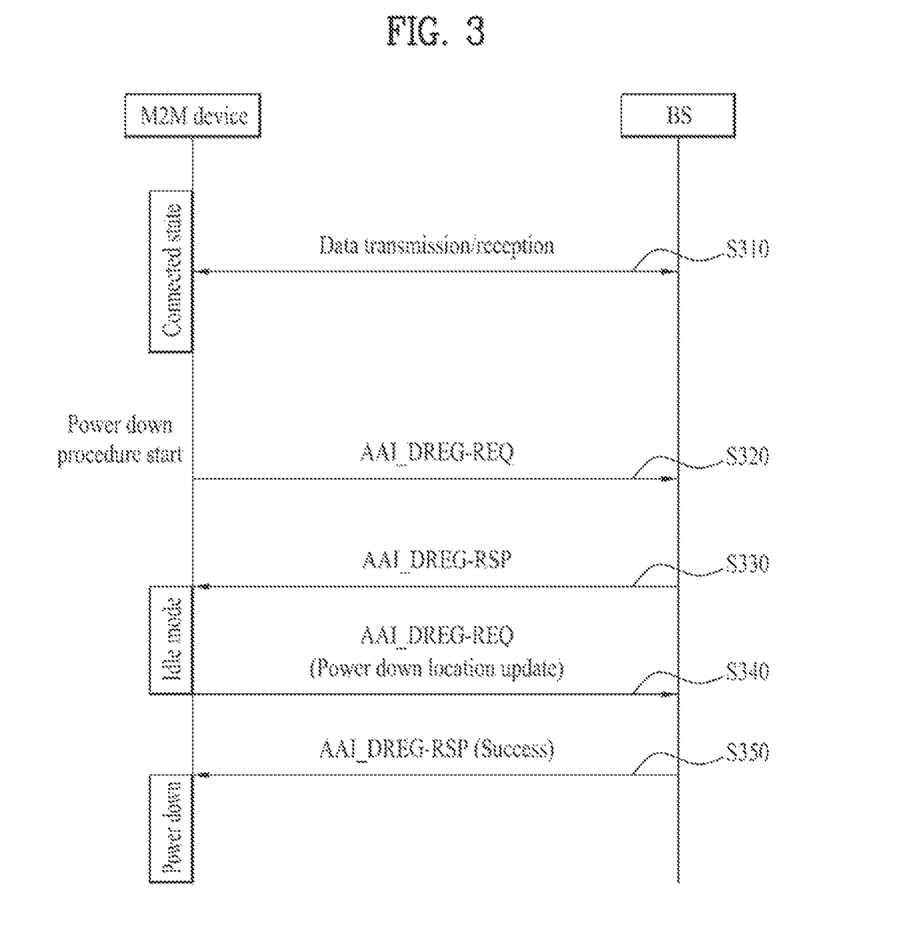
FIG. 3 is a diagram illustrating one method by which an M2M device of the present invention performs a power down procedure.

FIG. 3 is a diagram illustrating one method by which an M2M device of the present invention performs a power down procedure.

The M2M device transmits and receives data to and from a BS in a connected state (S310).

If a power down event occurs in the M2M device, the M2M device transmits a deregistration request (AAI_DREG-REQ) message to the BS in order to enter a power off state (S320).

Upon receiving the AAI_DREG-REQ message, the BS transmits a deregistration response (AAI_DREG-RSP) message to the M2M device as a response to the AAI_DREG-REQ message to permit transition to idle mode (S330).

Upon receiving the AAI_DREG-RSP message, the M2M device transitions to the idle mode and performs location update in order to transition to a power off state. That is, the M2M device transmits a ranging request (AAI_RNG-REQ) message including an indicator indicating power down location update to the BS (S340).

The BS transmits a ranging response message indicating ranging success to the M2M device as a response to the AAI_RNG-REQ message (S350).

Upon receipt of the ranging response message, the M2M device enters a power down state.

As illustrated in FIG. 3, the M2M device in the connected state performs a power down procedure through a deregistration process (S320 and S330) and a power down location update process.

However, the operation of FIG. 3 has a disadvantage of performing an unnecessary process for the M2M device or the BS. In addition, upon occurrence of an involuntary power outage, the operation may delay a power outage reporting process of the M2M device. Accordingly, a method for rapidly reporting a power outage event upon occurrence of an abnormal power outage event will be described below.

4. Method for Performing Random Access Procedure Upon Occurrence of Abnormal Power Outage Event Hereinafter, methods for performing a random access procedure to rapidly report a power outage event to the BS upon occurrence of an abnormal power outage event will be described in detail as the embodiments of the present invention.

(1) Method for Performing Random Access Procedure Using New Contention-Based Parameters In an M2M environment in which M2M devices and normal MSs coexist, an abnormal power down event such as an involuntary power outage may happen. In this case, according to methods performed up to now, the M2M devices have performed a random access procedure using existing contention-based parameters (e.g. an initial backoff window size parameter, etc.). Then, since not only a plurality of M2M devices but also normal MSs use the same contention-based parameters, a congestion situation inevitably occurs. Therefore, the BS may separately pre-allocate contention-based parameters to be used in the abnormal power outage event to the M2M devices prior to occurrence of the abnormal power outage event.

When a power outage occurs, it is desirable that the M2M device should immediately report a power outage event to an M2M server through the BS. If the M2M device is in idle mode (refer to section 2), the M2M device should perform a network re-entry procedure in order to report the power outage event (refer to FIG. 3).

In this case, if the M2M device performs a random access procedure for network re-entry in the abnormal power outage event, the M2M device may reduce a congestion situation using new contention-based parameter values without using an existing initial ranging backoff start parameter value.

For example, the M2M device may use new contention-based dedicated parameters for the M2M device used only in a power outage event and the BS may transmit the new contention-based parameters to the M2M device through a broadcast message. In this case, since the M2M device uses a ranging backoff start parameter different from a parameter used by a normal MS, a congestion situation can be reduced.

Especially, in an IEEE 802.16m/16.1b system, an initial ranging backoff start parameter dedicated for an abnormal power outage event may be transmitted through a super frame header (SFH) or a system configuration descriptor (AAI_SCD) message. In an IEEE 802.16-2009 system, the parameter may be transmitted through an uplink channel descriptor (UCD) message.

Figure 4:
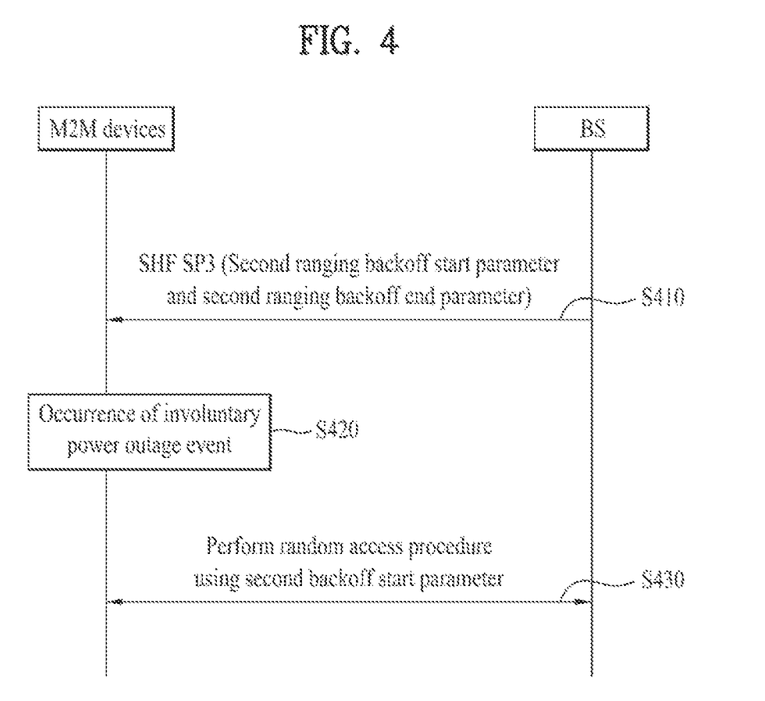
FIG. 4 is a diagram illustrating one method for performing a random access procedure in an involuntary power outage situation according to an embodiment of the present invention.

FIG. 4 is a diagram illustrating one method for performing a random access procedure in an involuntary power outage situation according to an embodiment of the present invention.

A BS may allocate new contention-based parameters dedicated for M2M devices to the M2M devices in an abnormal power outage state. In the embodiments of the present invention described below, existing contention-based parameters (e.g. initial ranging backoff start/end parameters) may be referred to first ranging backoff start/end parameters and new contention-based parameters (e.g. abnormal power outage ranging backoff start/end parameters) may be referred to as second ranging backoff start/end parameters.

Referring to FIG. 4, the BS may transmit new contention-based parameters to M2M devices using an SFH sub-packet 3 (SP3) (S410).

The following Table 1 shows an exemplary SFH SP3 format.

TABLE 1

| Syntax | Size (bits) | Description |
|---|---|---|
| SFH SP3 IE format( ){ | | |
| S-SFH change cycle | 3 | |
| ... | ... | ... |
| Initial ranging backoff start | 4 | Initial backoff window size for initial ranging contention, expressed as a power of 2. Values of n range 0-15 |

TABLE 1-continued

| Syntax | Size (bits) | Description |
| --- | --- | --- |
| Initial ranging backoff end | 4 | Final backoff window size for initial ranging contention, expressed as a power of 2. Values of n range 0-15 |
| Involuntary power outrage ranging backoff start | 8 | Initial backoff window size for initial ranging contention in case of involuntary power outage, expressed as a power of 2. Values of n range 0-255 |
| Involuntary power outrage ranging backoff end | 8 | Final backoff window size for initial ranging contention in case of involuntary power outage, expressed as a power of 2. Values of n range 0-255 |
| ... | ... | ... |

In Table 1, first ranging backoff parameters include an initial ranging backoff start parameter and an initial ranging backoff end parameter. The first ranging backoff parameters may be used by normal MSs or M2M devices of a normal mode state.

In Table 1, second ranging backoff parameters include an involuntary power outage ranging backoff start parameter and an involuntary power outage ranging backoff end parameter. The second ranging backoff parameters may be used only by M2M devices of an involuntary power outage state.

The initial ranging backoff start parameter in Table 1 indicates an initial backoff window size used for initial ranging contention and has a value of $2^n$ (where n=0, 1, ..., 15). The initial ranging backoff end parameter indicates a final backoff window size used for initial ranging contention and has a value of $2^n$ (where n=0, 1, ..., 15).

The involuntary power outage ranging backoff start parameter indicates an initial backoff window size used for initial ranging contention in an involuntary power outage event and has a value of $2^n$ (where n=0, 1, ..., 255). The involuntary power outage ranging backoff end parameter indicates a final backoff window size used for initial ranging contention in an involuntary power outage event and has a value of $2^n$ (where n=0, 1, ..., 255).

Referring back to FIG. 4, the BS broadcasts SFH SP3 as shown in Table 1. Upon receiving the SFH SP3 message, the M2M devices may confirm the first ranging backoff parameters and the second ranging backoff parameters included in the SFH SP3 message and store the parameters in a memory. In addition, the M2M devices may enter idle mode through the process described in section 2. Next, an involuntary power outage event may occur according to change in a channel environment (S420).

If the involuntary power outage event happens, M2M devices in idle mode may perform a random access procedure with the BS using the second ranging backoff parameters rather than the first ranging backoff parameters (S430).

Figure 5:
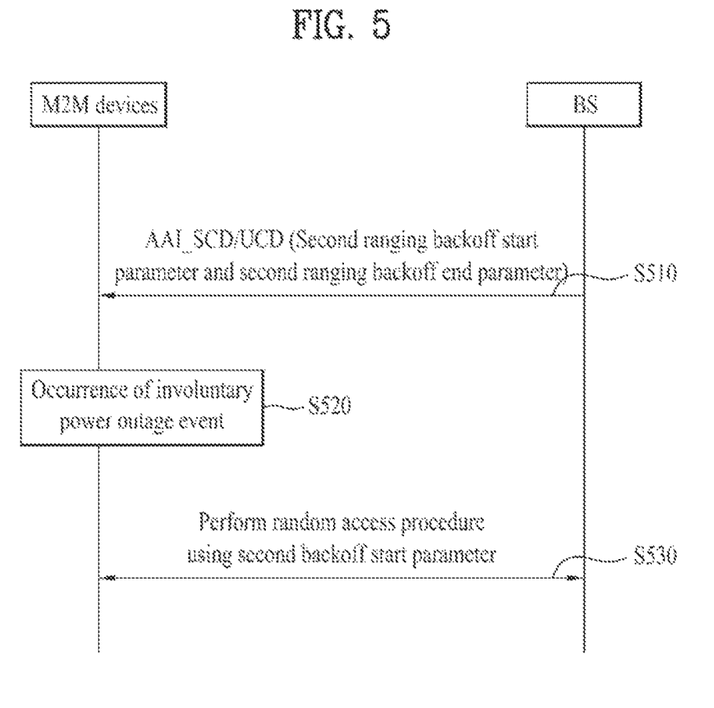
FIG. 5 is a diagram illustrating another method for performing a random access procedure in an involuntary power outage situation according to an embodiment of the present invention.

FIG. 5 is a diagram illustrating another method for performing a random access procedure in an involuntary power outage situation according to an embodiment of the present invention.

The Process of FIG. 5 is similar to that of FIG. 4. However, in FIG. 5, the BS transmits the second ranging backoff parameters to the M2M devices using an AAI_SCD message or a UCD message rather than the SFH SP3 message.

The following Table 2 shows an exemplary AAI_SCD message including the second ranging backoff parameters.

TABLE 2

| Field | Size (bits) | Description |
| --- | --- | --- |
| ... | ... | ... |
| Involuntary power outage ranging backoff start | | Initial backoff window size for initial ranging contention in case of involuntary power outage, expressed as a power of 2. Values of n range 0-255 |
| Involuntary power outage ranging backoff end | | Final backoff window size for initial ranging contention in case of involuntary power outage, expressed as a power of 2. Values of n range 0-255 |

In Table 2, an involuntary power outage ranging backoff start parameter indicates an initial backoff window size used for initial ranging contention in an involuntary power outage situation and has a value of $2^n$ (where n=0, 1, ..., 255). An involuntary power outage backoff end parameter indicates a final backoff window size used for initial ranging contention in an involuntary power outage situation and has a value of $2^n$ (where n=0, 1, ..., 255). The parameter values included in Table 2 may be used only when an involuntary power outage event occurs after the M2M device performs an initial network entry procedure.

The following Table 3 shows an exemplary UCD message including the second ranging backoff parameters.

TABLE 3

| Field | Type | Length | Value |
| --- | --- | --- | --- |
| ... | ... | ... | ... |
| Involuntary power outage ranging backoff start | x | 1 | Initial backoff window size for initial ranging contention in case of involuntary power outage, expressed as a power of 2. Values of n range 0-255 (the highest order bits shall be unused and set to 0) This TLV shall be used in NBR-ADV message only to represent corresponding values that appear in UCD message fields. |

TABLE 3-continued

| Field | Type | Length | Value |
|---|---|---|---|
| Involuntary power outage ranging backoff end | x | 1 | Final backoff window size for initial ranging contention in case of involuntary power outage, expressed as a power of 2. Values of n range 0-255 (the highest order bits shall be unused and set to 0) This TLV shall be used in NBR-ADV message only to represent corresponding values that appear in UCD message fields |
| ... | ... | ... | ... |

Referring to Table 3, an involuntary power outage ranging backoff start parameter, expressed as a type/length/value (TLV) format, indicates an initial backoff window size used for initial ranging contention in an involuntary power outage and has a value of $2^n$ (where n=0, 1, ..., 255). In addition, an involuntary power outage ranging backoff end parameter, expressed as a type/length/value (TLV) format, indicates a final backoff window size used for initial ranging contention in an involuntary power outage situation and has a value of $2^n$ (where n=0, 1, ..., 255). In this case, the highest order bits of the involuntary power outage ranging backoff start/end parameters are not used and are set to 0. The TLV is used in a neighboring BS broadcast (NBR-ADV) message and represents corresponding values in UCD message fields.

Referring back to FIG. 5, the BS transmits the second ranging backoff start parameter and the second ranging backoff end parameter to the M2M devices using the AAI_SCD message or UCD message described in Table 2 and Table 3 (S510).

Upon receiving the AAI_SCD message or the UCD message, the M2M devices may confirm the first ranging backoff parameters and second ranging backoff parameters included in the AAI_SCD message or the UCD message and store the parameters in a memory.

In addition, the M2M devices may enter idle mode through the process described in steps S320 and S330 of FIG. 3. Next, an involuntary power outage event may occur according to change in a channel environment (S520).

If the involuntary power outage event happens, the M2M devices in the idle mode may perform a random access procedure with the BS using the second ranging backoff parameters rather than the first ranging backoff parameters (S530).

The second ranging backoff parameters (i.e. involuntary power outage backoff start/end parameters) described with reference to FIG. 4 and FIG. 5 are used when the M2M devices perform a random access procedure when an involuntary power outage occurs.

If it is desired to perform a normal random access procedure, the M2M devices and normal MSs use conventionally defined first ranging backoff parameters (i.e. initial ranging backoff start/end parameters) or bandwidth request backoff start/end parameters.

For example, if the involuntary power outage event occurs in an M2M device in connected mode rather than idle mode, the M2M device may perform the random access procedure using the first ranging backoff parameters or the bandwidth request backoff start/end parameters.

Obviously, the M2M device may be differentiated from the normal MS so that the M2M device may perform the random access procedure using the second ranging backoff parameters instead of the first ranging backoff parameters, irrespective of normal mode or idle mode.

(2) Method for Performing Random Access Procedure Using Scaling Factor

Figure 6:
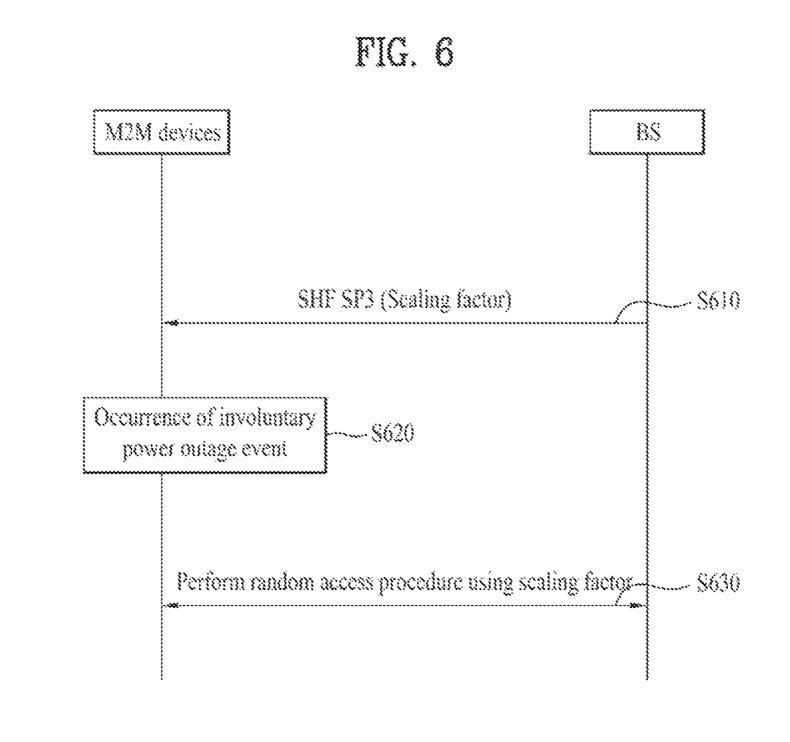
FIG. 6 is a diagram illustrating a method for performing a random access procedure to report an involuntary power outage event using a scaling factor according to an embodiment of the present invention.

FIG. 6 is a diagram illustrating a method for performing a random access procedure to report an involuntary power outage event using a scaling factor according to an embodiment of the present invention.

In the following embodiments, the BS may allocate a scaling factor for involuntary power outage reporting to the M2M devices. In this case, the M2M devices may determine a backoff window size therefor by multiplying a scaling factor value by an existing backoff window size value (e.g. first ranging backoff parameters (initial ranging backoff start/end parameters)) or bandwidth request backoff start/end parameters.

Referring to FIG. 6, the BS broadcasts an SFH SP3 message including the first ranging backoff parameters and the scaling factor within a cell thereof (S610).

The following Table 4 illustrates an exemplary SFH SP3 used in step S610.

TABLE 4

| Syntax | Size (bits) | Description |
|---|---|---|
| SFH SP3 IE format( ){ | | |
| S-SFH change cycle | 3 | |
| ... | ... | ... |
| Initial ranging backoff start | 4 | Initial backoff window size for initial ranging contention, expressed as a power of 2. Values of n range 0-15 |
| Initial ranging backoff end | 4 | Final backoff window size for initial ranging contention, expressed as a power of 2. Values of n range 0-15 |
| Scaling factor for involuntary power outage ranging backoff | 4 | M2M devices will use this scaling factor only when the devices perform the random access (e.g., contention-based ranging or contention-based BR) due to the involuntary power outage situation. |
| ... | ... | ... |

The initial ranging backoff start parameter shown in Table 4 indicates an initial backoff window size used for initial ranging contention and has a value of $2^n$ (where n=0, 1, ..., 15). The initial ranging backoff end parameter indicates a final backoff window size used for initial ranging contention and has a value of $2^n$ (where n=0, 1, ..., 15). The SFH SP3 message of Table 4 further includes a 4-bit scaling factor. Upon performing a random access procedure due to an involuntary power outage situation, the M2M device may determine a ranging window size using a scaling factor for involuntary power outage ranging backoff.

Referring back to FIG. 6, upon receiving the SFH SP3 message, the M2M devices store the first ranging backoff parameters and the scaling factor included in the SFH SP3 message in a memory. The M2M devices of FIG. 6 may enter idle mode through the process described in steps S320 and S330. Next, an involuntary power outage event may occur according to change in a channel environment (S620).

In this case, the M2M devices may perform a random access procedure for reporting an involuntary power outage event using the scaling factor received in step S610.

For example, the M2M devices in an idle mode state in S630 may determine a ranging backoff start value for involuntary power outage reporting by multiplying the scaling factor by the initial ranging backoff start parameter (i.e. ranging backoff start for involuntary power outage=initial ranging backoff start*scaling factor) and determines a ranging backoff end value by multiplying the scaling factor by the initial ranging backoff end parameter (i.e. ranging backoff end for involuntary power outage=initial ranging backoff end*scaling factor).

Figure 7:
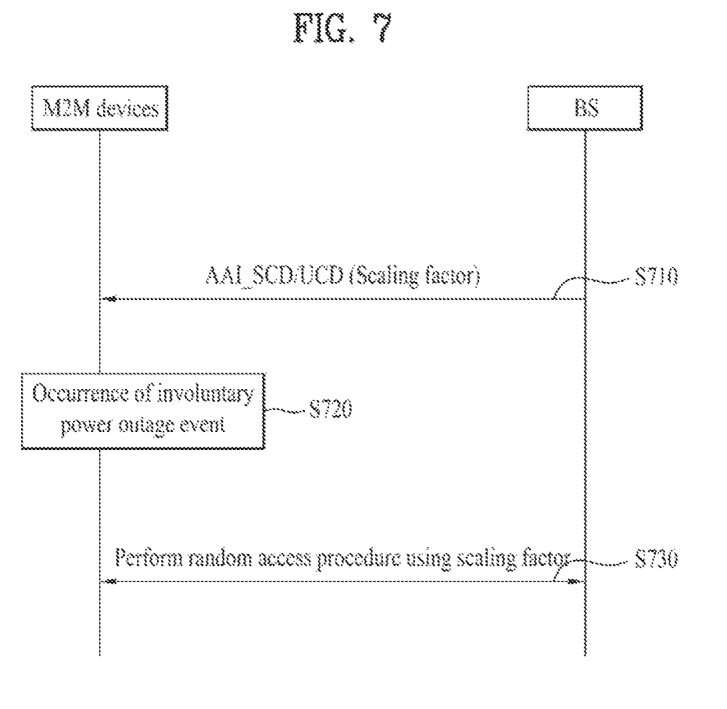
FIG. 7 is a diagram illustrating another method for performing a random access procedure to report an involuntary power outage event using a scaling factor according to an embodiment of the present invention.

FIG. 7 is a diagram illustrating another method for performing a random access procedure to report an involuntary power outage event using a scaling factor according to an embodiment of the present invention.

The embodiment of FIG. 7 is similar to that of FIG. 6. However, a message transmitted in step S710 is an AAI_SCD message or a UCD message rather than an SFH SP3.

Referring to FIG. 7, the BS transmits the AAI_SCD message or the UCD message including one or more of the first ranging backoff parameters and the scaling factor to the M2M devices.

Table 5 shows an exemplary AAI_SCD message format used in step S710.

TABLE 5

| Field | Size (bits) | Description |
|---|---|---|
| ... | ... | ... |
| Scaling factor for involuntary power outrage random backoff | 4 | M2M devices will use this scaling factor only when the devices perform the random access (e.g., contention-based ranging or contention-based BR) due to the involuntary power outage situation. |
| ... | ... | ... |

The AAI_SCD message of Table 5 includes a 4-bit scaling factor. The M2M devices may determine a ranging window size using a scaling factor for involuntary power outrage ranging backoff only upon performing a random access procedure due to an involuntary power outage situation.

The following Table 6 illustrates an exemplary UCD message format used in step S710.

TABLE 6

| Field | Type | Length | Description |
|---|---|---|---|
| ... | ... | ... | ... |
| Scaling Factor for involuntary power outrage random backoff | x | 1 | M2M devices will use this scaling factor only when the devices perform the random access (e.g., contention-based ranging or contention-based BR) due to the involuntary power outage situation. |
| ... | ... | ... | ... |

The UCD message of Table 6 includes a 4-bit scaling factor. The M2M devices may determine a ranging window size using a scaling factor for involuntary power outrage ranging backoff only upon performing a random access procedure due to an involuntary power outage situation.

Referring back to FIG. 7, upon receipt of the AAI_SCD message or the UCD message, the M2M devices may store the first ranging backoff parameters and the scaling factor included in the AAI_SCD message or the UCD message in a memory. Notably, the first ranging backoff parameters may be transmitted through the SFH SP3 message rather than the AAI_SCD message or the UCD message.

The M2M devices of FIG. 7 may enter idle mode through the process described in steps S320 and S330 of FIG. 3. Next, an involuntary power outrage event may happen according to change of a channel environment (S720).

The M2M devices in idle mode may perform a random access procedure for reporting an involuntary power outrage event using the scaling factor received in step S710 (S730).

For example, the M2M devices in an idle mode state in S730 may determine a ranging backoff start value for involuntary power outage reporting by multiplying the scaling factor by the initial ranging backoff start parameter (i.e. ranging backoff start for involuntary power outage=initial ranging backoff start*scaling factor) and determine a ranging backoff end value by multiplying the scaling factor by the initial ranging backoff end parameter (i.e. ranging backoff end for involuntary power outage=initial ranging backoff end*scaling factor).

(3) Method for Performing Random Access Procedure Using Scaling Factor and Second Ranging Backoff Parameters Hereinafter, a method further considering the scaling factor in the method described in section 4.(1) will be described. That is, the size of the SFH SP3 message, the AAI_SCD message, or the UCD message described in section 4.(1) can be reduced by considering new contention-based parameters and the scaling factor together.

The following Table 7 shows another exemplary SFH SP 3 used in step S410.

TABLE 7

| Field | Size (bits) | Description |
|---|---|---|
| ... | ... | ... |
| Involuntary power outage ranging backoff start | 4 | Initial backoff window size for initial ranging contention in case of involuntary power outage, expressed as a power of 2. Values of n range 0-15 |
| Involuntary power outage ranging backoff end | 4 | Final backoff window size for initial ranging contention in case of involuntary power outage, expressed as a power of 2. Values of n range 0-15 |
| Scaling factor for involuntary power outage ranging backoff | 4 | M2M devices will use this scaling factor only when the devices perform the random access (e.g., contention-based ranging or contention-based BR) due to the involuntary power outage situation. |
| ... | ... | ... |

In Table 7, involuntary power outage ranging backoff start/end parameters are provided as second ranging backoff parameters. The involuntary power outage ranging backoff start parameter indicates an initial backoff window size used for initial ranging contention in an involuntary power outage situation and has a value of $2^n$ (where n=0, 1, ..., 15). The involuntary power outage ranging backoff end parameter indicates a final backoff window size used for initial ranging contention in an involuntary power outage situation and has a value of $2^n$ (where n=0, 1, ..., 15). The SFH SP3 message of Table 7 may further include a 4-bit scaling factor. Only upon performing a random access procedure due to an involuntary power outage event, the M2M devices may determine a ranging window size using the scaling factor for involuntary power outage ranging backoff.

For example, upon receiving the SFH SP3 message shown in Table 7, the M2M devices of FIG. 4 may determine a ranging window size for performing a random access procedure by multiplying the scaling factor by the involuntary power outage ranging backoff start parameter and/or the involuntary power outage ranging backoff end parameter and perform the random access procedure.

The following Table 8 shows another exemplary AAI_SCD message including the second ranging backoff parameters.

TABLE 8

| Field | Size (bits) | Description |
|---|---|---|
| ... | ... | ... |
| Involuntary power outage ranging backoff start | 4 | Initial backoff window size for initial ranging contention in case of involuntary power outage, expressed as a power of 2. Values of n range 0-15. |
| Involuntary power outage ranging backoff end | 4 | Values of n range 0-15. Final backoff window size for initial ranging contention in case of involuntary power outage, expressed as a power of 2. Values of n range 0-15. |
| Scaling factor for involuntary power outage random backoff | 4 | M2M devices will use this scaling factor only when the devices perform the random access (e.g., contention-based ranging or contention-based BR) due to the involuntary power outage situation. |
| ... | ... ... | |

In Table 8, an involuntary power outage ranging backoff start parameter indicates an initial backoff window size used for initial ranging contention in an involuntary power outage situation and has a value of $2^n$ (where n=0, 1, ..., 15). An involuntary power outage backoff end parameter indicates a final backoff window size used for initial ranging contention in an involuntary power outage situation and has a value of $2^n$ (where n=0, 1, ..., 15). Notably, the AAI_SCD message of Table 8 may further include a 4-bit scaling factor. Only upon performing a random access process due to an involuntary power outage situation, the M2M devices may determine a ranging window size using the scaling factor for involuntary power outage ranging backoff.

For example, upon receiving the AAI_SCD message shown in Table 8, the M2M devices of FIG. 5 may determine a ranging window size for performing a random access procedure by multiplying the scaling factor by the involuntary power outage ranging backoff start parameter and/or the involuntary power outage ranging backoff end parameter and perform the random access procedure.

(4) Method for Reporting Involuntary Power Outage Event Through Bandwidth Request Procedure The above embodiments have described the methods for performing the random access procedure to perform a network re-entry procedure in order for the M2M devices to report an involuntary power outage event. Hereinafter, a method by which connected-mode M2M devices rather than idle-mode M2M devices perform involuntary power outage reporting will be described.

M2M devices in normal mode may report an involuntary power outage event through a bandwidth request procedure instead of the random access procedure described in FIGS. 4 to 7, in the case in which an involuntary power outage event occurs.

The following Table 9 illustrates exemplary new contention-based parameters included in an SFH SP3 message, an AAI-SDC message, or a UCD message.

TABLE 9

| Syntax | Size | Description |
|---|---|---|
| ... | ... | ... |
| Bandwidth request backoff start for involuntary power outage | 8 | Initial backoff window size for contention BRs, expressed as a power of 2. Values of n range 0-255 (the highest order bits shall be unused and set to 0). |
| Bandwidth request backoff end for involuntary power outrage | 8 | Final backoff window size for contention BRs, expressed as a power of 2. Values of n range 0-255. |

Referring to Table 9, a bandwidth request backoff start parameter and a bandwidth request backoff end parameter for reporting an involuntary power outage event are shown as an example of the new contention-based parameters.

The bandwidth request backoff start parameter indicates an initial backoff window size used for bandwidth contention in an involuntary power outage situation and has a value of $2^n$ (where n=0, 1, ..., 255). In addition, the bandwidth request backoff end parameter indicates a final backoff window size used for bandwidth request contention in an involuntary power outage situation and has a value of $2^1$ (where n=0, 1, ..., 255). In this case, the highest order bits of the bandwidth request backoff start/end parameters are not used and are set to 0.

Accordingly, upon occurrence of an involuntary power outrage event, the M2M devices in normal mode may report the involuntary power outrage event to the BS through a bandwidth request message based on the bandwidth request backoff start/end parameters for reporting the involuntary power outage event shown in Table 9.

The messages of Table 9 may further include a scaling factor. In this case, the M2M devices in normal mode may report an involuntary power outage event by transmitting the bandwidth request message to the BS using the bandwidth request backoff start/end parameters and the scaling factor.

For example, the M2M devices in normal state other than idle mode in S630 or S730 may determine a bandwidth request backoff start value for involuntary power outage reporting by multiplying a scaling factor value by a bandwidth request backoff start parameter value (i.e. bandwidth request backoff start for involuntary power outage=bandwidth request backoff start*scaling factor) and determine a bandwidth request backoff end value by multiplying the scaling factor value by a bandwidth request backoff end parameter value (i.e. bandwidth request backoff end for involuntary power outage=bandwidth request backoff end*scaling factor).

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein. Claims which are not explicitly dependent on each other may be combined to provide the embodiments or new claims may be added through amendment after this application is filed.

Industrial Applicability

The embodiments of the present invention may be applied to a variety of wireless access systems. Examples of the wireless access systems include a 3rd Generation Partnership Project (3GPP) system, a 3GPP2 system, and/or an Institute of Electrical and Electronic Engineers (IEEE) 802 system. The embodiments of the present invention may be applied not only to the various wireless access systems but also to all technical fields to which the various wireless access systems are applicable.

The invention claimed is:

1. A method for performing a random access procedure to report an involuntary power outage event in a wireless access system supporting a machine-to-machine (M2M) environment, the method comprising:
   receiving a message including a scaling factor, an involuntary power outage ranging backoff start parameter and an involuntary power outage ranging backoff end parameter, to be used by an M2M device to report the involuntary power outage event;
   entering idle mode; and
   after occurrence of the involuntary power outage event in the idle mode, performing the random access procedure for reporting the involuntary power outage event,
   wherein the random access procedure is performed based on a value obtained by multiplying the scaling factor by one or more of the involuntary power outage ranging backoff start parameter and the involuntary power outage ranging backoff end parameter.

2. The method according to claim 1, wherein the message is one of a superframe subpacket-3 message, a system configuration descriptor message, and an uplink channel descriptor message.

3. The method according to claim 1,
   wherein the message further includes an initial ranging backoff start parameter and an initial ranging backoff end parameter for initial ranging contention, and
   wherein the method further comprises performing the random access procedure using one or more of the initial ranging backoff start parameter and the initial ranging backoff end parameter if the involuntary power outage situation is not occurred.

4. A machine-to-machine (M2M) device for performing a random access procedure to report an involuntary power outage event in a wireless access system supporting an M2M environment, the M2M device comprising:
   a transmitter;
   a receiver; and
   a processor operatively connected to the transmitter and the receiver, the processor configured to:
      support the random access procedure;
      receive, using the receiver, a message including a scaling factor, an involuntary power outage ranging backoff start parameter and an involuntary power outage ranging backoff end parameter, to be used to report the involuntary power outage event;
      enter an idle mode; and
      after occurrence of the involuntary power outage event in the idle mode, perform the random access procedure for reporting the involuntary power outage event,
      wherein the random access procedure is performed based on a value obtained by multiplying the scaling factor by one or more of the involuntary power outage ranging backoff start parameter and the involuntary power outage ranging backoff end parameter.

5. The M2M device according to claim 4, wherein the message is one of a superframe subpacket-3 message, a system configuration descriptor message, and an uplink channel descriptor message.

6. The M2M device according to claim 4,
   wherein the message further includes an initial ranging backoff start parameter and an initial ranging backoff end parameter, for initial ranging contention, and
   wherein the processor is further configured to perform the random access procedure using one or more of the initial ranging backoff start parameter and the initial ranging backoff end parameter, if the involuntary power outage situation is not occurred.

* * * * *